(12) United States Patent
Yamagajo et al.

(10) Patent No.: US 8,172,149 B2
(45) Date of Patent: May 8, 2012

(54) WIRELESS FREQUENCY TAG AND METHOD FOR MANUFACTURING WIRELESS FREQUENCY TAG

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/694,787

(22) Filed: Jan. 27, 2010

(65) Prior Publication Data
US 2010/0127085 A1 May 27, 2010

Related U.S. Application Data

(63) Continuation of application No. PCT/JP2007/065804, filed on Aug. 13, 2007.

(51) Int. Cl.
*G06K 19/00* (2006.01)

(52) U.S. Cl. ........ 235/492

(58) Field of Classification Search ........ 235/492, 235/380, 435
See application file for complete search history.

(56) References Cited

U.S. PATENT DOCUMENTS

| | | | |
|---|---|---|---|
| 6,879,258 B2 * | 4/2005 | Kuroda et al. | 340/572.1 |
| 7,416,135 B2 * | 8/2008 | Tanaka et al. | 235/492 |
| 2005/0092845 A1 | 5/2005 | Forster | |
| 2006/0032926 A1 | 2/2006 | Baba | |
| 2006/0145872 A1 | 7/2006 | Tanaka et al. | |
| 2006/0208901 A1 * | 9/2006 | Kai et al. | 340/572.7 |
| 2006/0232418 A1 | 10/2006 | Baba | |
| 2007/0008134 A1 | 1/2007 | Kai | |

FOREIGN PATENT DOCUMENTS

| | | |
|---|---|---|
| EP | 1626364 A2 | 2/2006 |
| EP | 1742296 | 1/2007 |
| EP | 1626364 A3 | 3/2007 |
| JP | 08252995 A * | 10/1996 |
| JP | 200448233 | 2/2004 |
| JP | 2006-53833 | 2/2006 |
| JP | 2006-301690 | 11/2006 |
| JP | 2006-331101 | 12/2006 |
| JP | 2007-19905 | 1/2007 |
| JP | 2007-124443 | 5/2007 |
| JP | 2007124443 | 5/2007 |
| WO | 2006064540 | 6/2006 |
| WO | 2006072990 | 7/2006 |
| WO | 2007029296 | 3/2007 |

OTHER PUBLICATIONS

International Search Report dated Nov. 13, 2007 received in corresponding PCT/JP2007/065804.
Extended European Search Report for application No. 07792447.0-1248 dated Oct. 6, 2010.
Dubost G: "A Tuneable Thick Folded-Dipole Operating in Two Octaves" IEEE Group on Antennas and Propagation International Symposium, IEEE, New York, NY, US, Jan. 1, 1975, pp. 248-251, XP002082335.
Korean Notice of Preliminary Rejection dated May 30, 2011 for application No. 10-2010-7003270.
First Notification Office Action dated Sep. 23, 2011 issued in the corresponding Chinese Patent Application No. 200780100255.3.

* cited by examiner

*Primary Examiner* — Seung Lee
(74) *Attorney, Agent, or Firm* — Murphy & King, P.C.

(57) ABSTRACT

A wireless frequency tag includes a loop-shaped antenna pattern that is electrically connected to a chip connecting section, and a conducting member that electrically couples a part of the antenna pattern.

3 Claims, 13 Drawing Sheets

WIRELESS FREQUENCY TAG AND METHOD FOR MANUFACTURING WIRELESS FREQUENCY TAG

CROSS-REFERENCE TO RELATED APPLICATION

This application is a continuation application of a PCT international application No. PCT/JP2007/065804 filed on Aug. 13, 2007 in Japan, the entire contents of which are incorporated by reference.

FIELD

The embodiments discussed herein are related to a wireless frequency tag and a method for manufacturing a wireless frequency tag.

BACKGROUND

RFID (radio frequency identification) systems have been known as one type of wireless communication systems. Such an RFID system generally includes a wireless frequency tag (also referred to as an "RFID tag") and a reader-writer (RW) apparatus, wherein information is read from or written into the wireless frequency tag from the RW apparatus by means of wireless communication.

Known wireless frequency tags include one type of tags that can operate using a power source embedded in the wireless frequency tag (such a type is referred to as "active tags") and another type of tags that operate using wireless waves received from an RW apparatus as driving power (such a type is referred to as "passive tags").

In an RFID system using a passive tag, the wireless frequency tag operates an embedded integrated circuit, such as an IC or an LSI, using wireless signals from an RW apparatus as driving power, and performs various processing in accordance with received wireless signals (control signals). Transmission from the wireless frequency tag to the RW apparatus is achieved using reflected waves of the received wireless signals. That is, various information, such as a tag ID or results of the processing, is carried on the reflected waves, which is sent to the RW apparatus.

Note that a variety of frequency bands have been used for RFID systems, and recently, the UHF band (860 MHz to 960 MHz) is attracting attentions. The UHF band can allow long distance communications more easily than the 13.56 MHz band or the 2.45 GHz band that have been conventionally used. Frequencies around 868 MHz, 915 MHz, and 953 MHz are used in Europe in the United States, and in Japan, respectively. The communication ranges of wireless frequency tags (hereinafter, simply referred to as "tags") in the UHF band are about between 3 meters and 5 meters, although the ranges depend on an integrated circuit, such as an IC chip or an LSI, used in the tags. In addition, the outputs of RW apparatuses are about one watt (W).

Conventional wireless frequency tags include, for example, those disclosed in Patent References 1 to 3 that will be listed below.

The technique disclosed in Patent Reference 1 is directed to reduce a drop in the communication distance of an RFID tag even when the RFID tag is used in proximity to a wireless absorptive material, thereby assuring reliability of communication. For this purpose, Patent Reference 1 discloses an RFID tag that includes a dielectric member shaped in the rectangular parallelepiped shape and having a predetermined permittivity, an antenna pattern for sending and receiving which is formed in a loop shape by means of etching or the like on the front face of this dielectric member, and an IC chip that is electrically connected to this antenna pattern via a chip-mounted pad.

When this RFID tag is used for an object that has a certain electrical conductivity, such as a bottle containing liquid or a living human body, a miniature loop antenna is formed by the antenna pattern around the dielectric member, which results in formation of a current loop on the object to which the tag is to be adhered. Thus, an even greater current loop is formed, which can contribute to increase in the gain of loop antenna, thereby increasing the communication distance.

The technique disclosed in Patent Reference 2 is directed to manufacturing an RFID tag that has a longer communication distance and that facilitates printing thereon. For this purpose, the RFID tag of Patent Reference 2 is formed by bonding a first component and a second component. The first component includes a plate-shaped first base made of a dielectric material, and a metal layer covering a first face of the front and back faces of the first base. The second component includes a sheet-like second base, and metal pattern that is formed on the second base and is electrically connected to the metal layer of the first component, forming a communication antenna, and a circuit chip that is connected to the metal pattern and performs wireless communication by the communication antenna, and a bonding material layer for bonding the second base to the second face opposing to the first face of the front and back faces of the first base. The metal layer of the first component and the metal pattern of the second component are electrically connected via a conducting component.

The technique disclosed in Patent Reference 3 is directed to providing an RFID tag that restrains a change in the resonant wavelength and the Q value, thereby assuring satisfactory communication status, even when the tag is disposed inside an apparatus including metal. For this purpose, Patent Reference 3 teaches a tag that is formed from a substrate in a substantial circular shape which has a loop-shaped antenna pattern and an IC, and a disk-shaped magnetic sheet which has a diameter substantially equal to that of the substrate, wherein the inductance can be easily adjusted by providing a cut-out portion of a single like in a part of the circumference of the magnetic sheet.

The magnetic sheet can reduce the influence of any metallic member disposed inside an apparatus. In addition, by selecting the width of the cut-out portion such that the reduction in the inductance of the antenna caused by the metal is offset by an increase in the inductance provided by the magnetic sheet, a change in the resonant wavelength and the Q value can be compensated, thereby assuring satisfactory communication status.

Patent Document 1: Japanese Patent Publication No. 2006-53833

Patent Document 2: Japanese Patent Publication No. 2006-301690

Patent Document 3: Japanese Patent Publication No. 2006-331101

When a wireless frequency tag for the UHF band is attached to metal, impedance matching with an integrated circuit, such as IC chips or LSIs (hereinafter, simply referred to as "chips"), and the gain may be deteriorated, which may render communication difficult. To address this issue, although various attempts have been made to form antenna patterns of wireless frequency tags in a loop shape, as the techniques disclosed in the above-referenced Patent References 1-3, it is difficult to adjust impedance matching (hereinafter, referred to as "matching adjustment") in wireless frequency tags having a loop-shaped antenna pattern when the susceptance component of the chip (the imaginary part of the admittance which is the inverse of the impedance (typically, represented by B)) is significant.

That is, since the equivalent circuit of a chip mounted in a wireless frequency tag can be represented by the parallel capacitance component Ccp and the parallel resistance component Rcp, the susceptance component B varies dominantly dependent on the capacitance component Ccp. If the capacitance component Ccp becomes too high, design and adjustment of the antenna impedance to be matched with the capacitance component Ccp becomes difficult.

Figure 13:
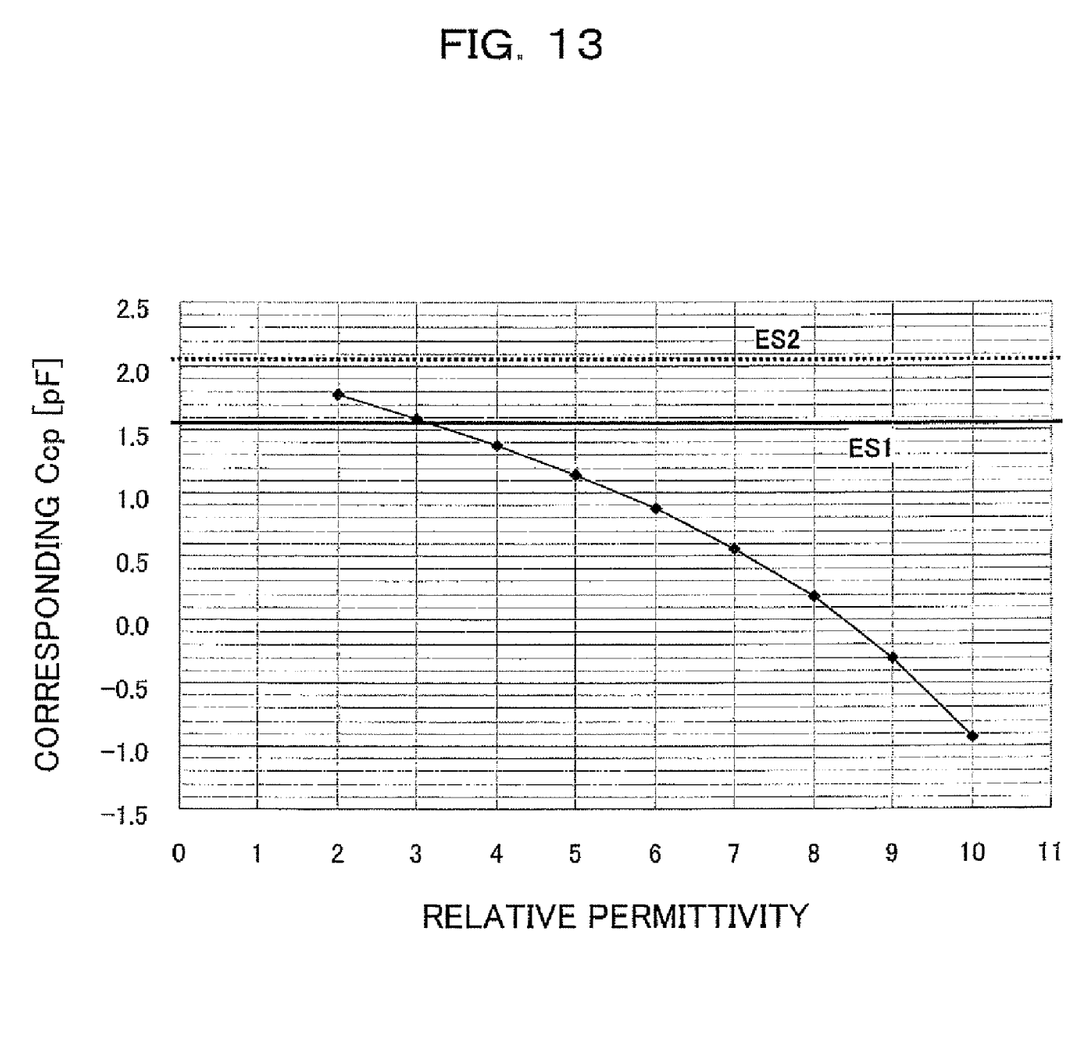
FIG. 13 is a graph indicating change in the corresponding capacitance component (Ccp) when the relative permittivity of substrate (dielectric material) of the wireless is modified.

For example, one technique to adjust the antenna impedance is increasing the corresponding capacitance component Ccp by modifying (reducing) the relative permittivity of a dielectric material (substrate) on which the antenna pattern is formed, as depicted in FIG. 13 (relative permittivity versus Ccp characteristics). Since reduction in the relative permittivity is limited to a certain level (the minimum value is one which is the relative permittivity of air), however, it is difficult to address to a chip requiring the corresponding capacitance component Ccp of smaller than this limit (ES2 in FIG. 13).

In addition, although matching adjustment may be achieved by modifying the total length of a loop of a loop-shaped antenna pattern, the gain is reduced when the total length of the loop is shortened.

SUMMARY (1) According to an aspect of the embodiments, a device includes a wireless frequency tag including a chip connecting section that is to be connected to a chip; a loop-shaped antenna pattern that is electrically connected to the chip connecting section; and a conducting member that electrically couples a part of the antenna pattern.

(2) According to an aspect of the embodiments, a method includes a method for manufacturing a wireless frequency tag including forming a loop-shaped antenna pattern that is electrically connected to a chip connecting section to which a chip is to be connected; and forming a conducting member that electrically couples a part of the antenna pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from spirits and scope of the embodiments, as a matter of course.

(1) First Embodiment

Figure 1:
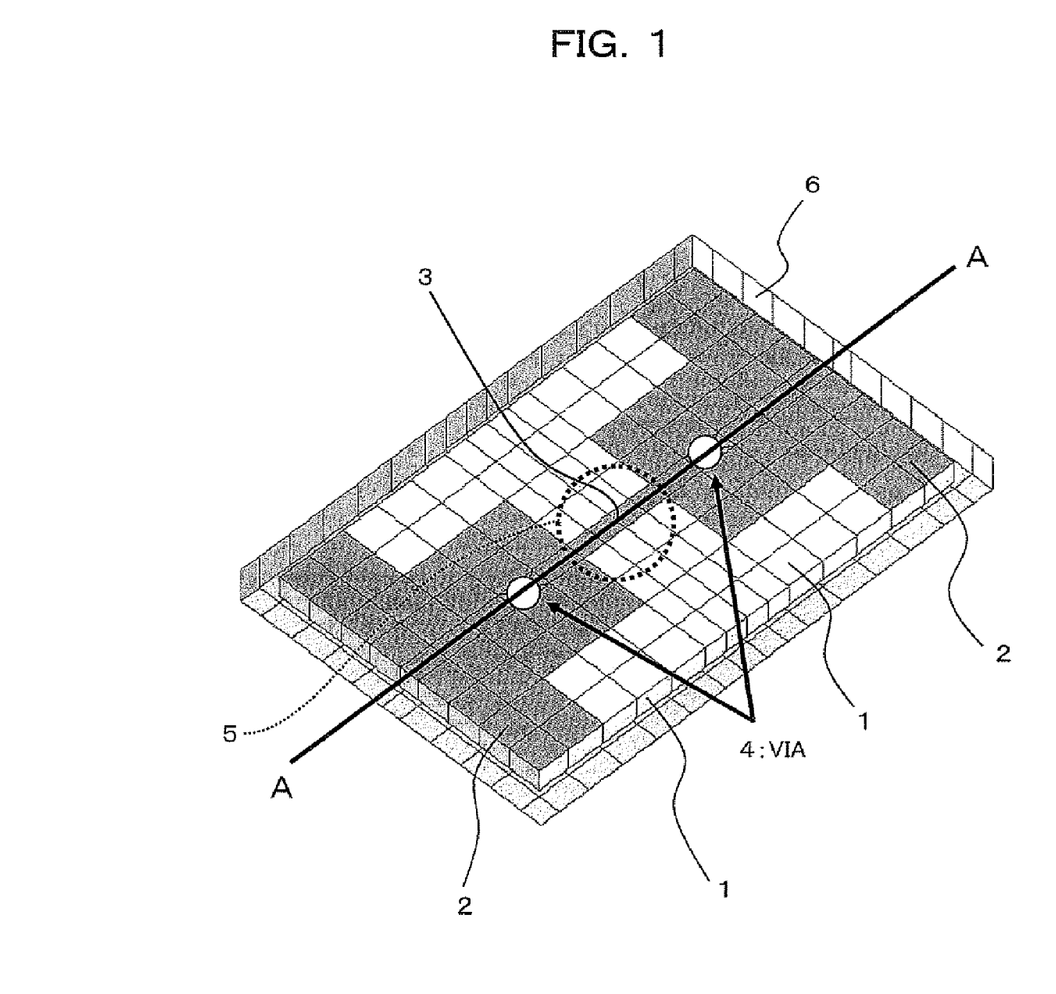
FIG. 1 is a schematic perspective view illustrating a configuration of a wireless frequency tag according to a first embodiment.
Figure 2:
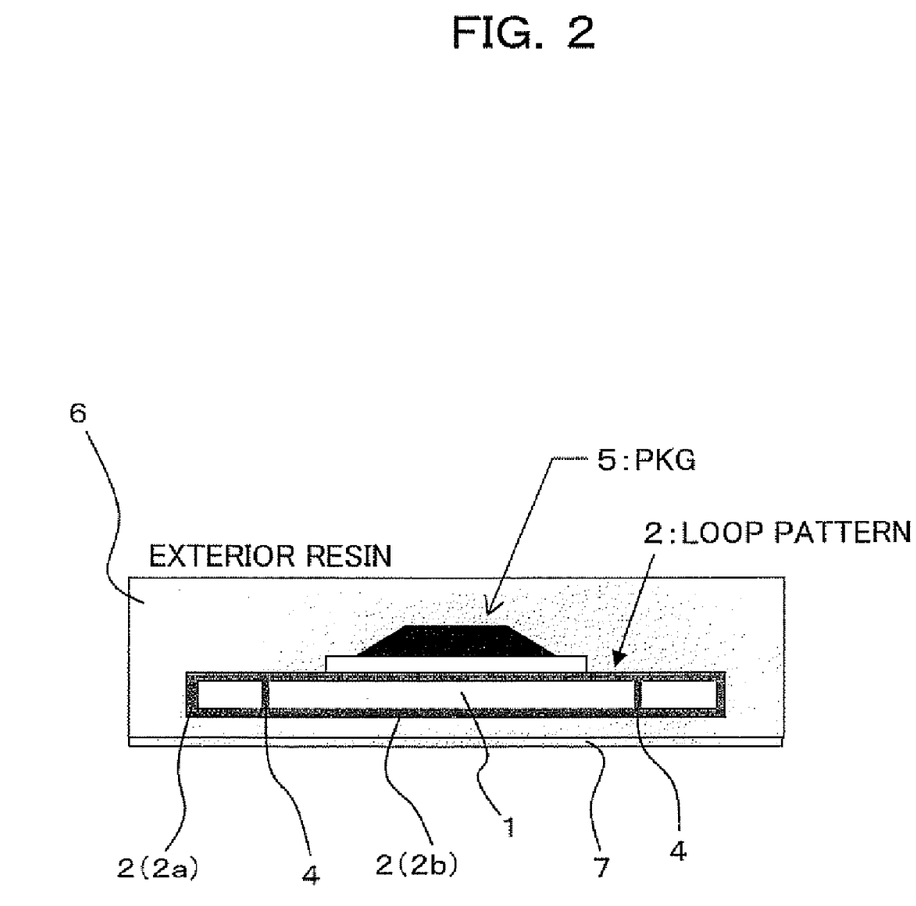
FIG. 2 is a cross-sectional view along Line A-A of the wireless frequency tag depicted in FIG. 1.

FIG. 1 is a schematic perspective view illustrating a configuration of a wireless frequency tag according to a first embodiment, and FIG. 2 is a cross-sectional view along Line A-A of the wireless frequency tag depicted in FIG. 1.

As depicted in FIG. 1 and FIG. 2, the wireless frequency tag of this embodiment includes: a substrate (dielectric member) 1; antenna patterns (hereinafter, referred to as "loop antennas") 2 that have conductor patterns 2 formed continuously on each face other than the side of the long sides of the substrate 1, that is, formed in a loop- (rectangular-) shape in the cross-sectional view in FIG. 2; a chip connecting section (feeding point) 3 that is electrically connected to the loop antenna 2 in the vicinity of the center of the face of the substrate 1 defining the long side of the loop antenna 2; vias (also referred to as "through-holes") 4 as conducting members that electrically couple the loop antenna 2 formed on the front and back faces of the substrate 1 at a plurality of locations (two locations in FIG. 1 and FIG. 2); an integrated circuit (chip package) 5, such as an IC chip or an LSI, which is electrically connected to the chip connecting section 3; an exterior resin 6 covering the entire substrate 1; and an adhesion layer 7 formed on the attaching (adhering) face to metal or the like of the exterior resin 6. Note that the chip package 5 is not illustrated in FIG. 1, and illustration of the exterior resin 6 is partially omitted.

The substrate 1 is made of a dielectric material having a predetermined permittivity, and can be formed from any suitable resins, such as polytetrafluoroethylene (PTFE), polyphenylene ether (PPE), or the like, for example.

The antenna patterns 2 can be formed by processing (e.g., performing etching or resist processing on) a metal conductor, such as copper or silver. In addition, the antenna patterns 2 may include a symmetric pattern in which the width thereof is increased from the feeding point 3 toward the ends in the longitudinal on the front face of the substrate 1, as depicted in FIG. 1, for example, so that a desired gain is achieved.

The vias 4 can be formed by providing an electrically conductive layer on the inner walls of holes extending through the substrate 1 by means of plating of the conductor, for example, and, in the example depicted in FIG. 1 and FIG. 2, are provided at locations that are symmetric with respect to the feeding point 3. As a result, as depicted in the cross-sectional view of FIG. 2, a part of the conductor patterns 2, i.e., the conductor patterns 2 formed on two opposing faces (front face and back face) of the substrate 1 are electrically connected (coupled) by the vias 4. Thereby, a first loop pattern 2a having the conductor pattern 2 formed on the faces (the front and back faces and the side faces) of the substrate 1 as the outer periphery (long sides and short sides), and a second loop pattern 2b having the conductor pattern 2 formed on the faces (the front and back faces) of the substrate 1 and the vias 4 as the inner periphery are defined. More specifically, two current loops may be defined primarily by each of the loop patterns 2a and 2b.

Note that, although the vias 4 may not necessarily be provided in symmetric locations, the required gain can be achieved more easily when they are provided in symmetric locations. In addition, as will be described later, the number of vias provided may be one (i.e., may be provided at a single location). That is, the second loop pattern 2b sharing a part of the loop pattern 2 (2a) may be suffice.

In the wireless frequency tag of this example configured as described above, since the second loop pattern 2b is formed without changing the loop length of the first loop pattern 2a, it is possible to rotate (change) the antenna impedance counterclockwise on the Smith chart while preventing a drop in the gain. In other words it is possible to increase the corresponding capacitance component Ccp of the antenna pattern 2. In addition, by changing (narrowing) the distance between the vias 4, it is possible to adjust (increase) the corresponding capacitance component Ccp. Thus, it becomes possible to easily achieve impedance matching even for an integrated circuit 5 (hereinafter, also referred to as a "chip 5" or "tag LSI 5") having a greater susceptance component.

Figure 3:
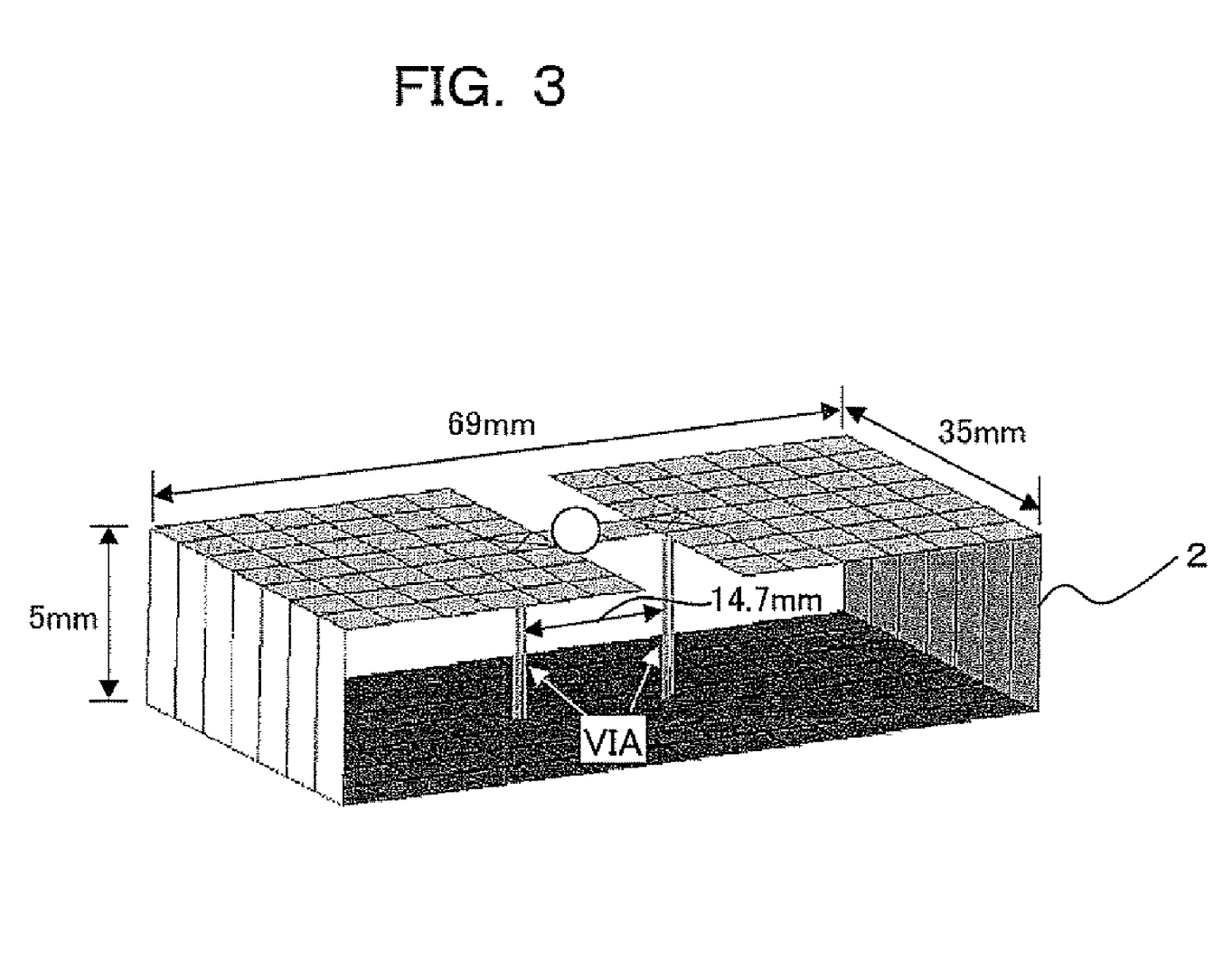
FIG. 3 is a schematic perspective view illustrating a simulation model of the wireless frequency tag depicted in FIG. 1 and FIG. 2.
Figure 4:
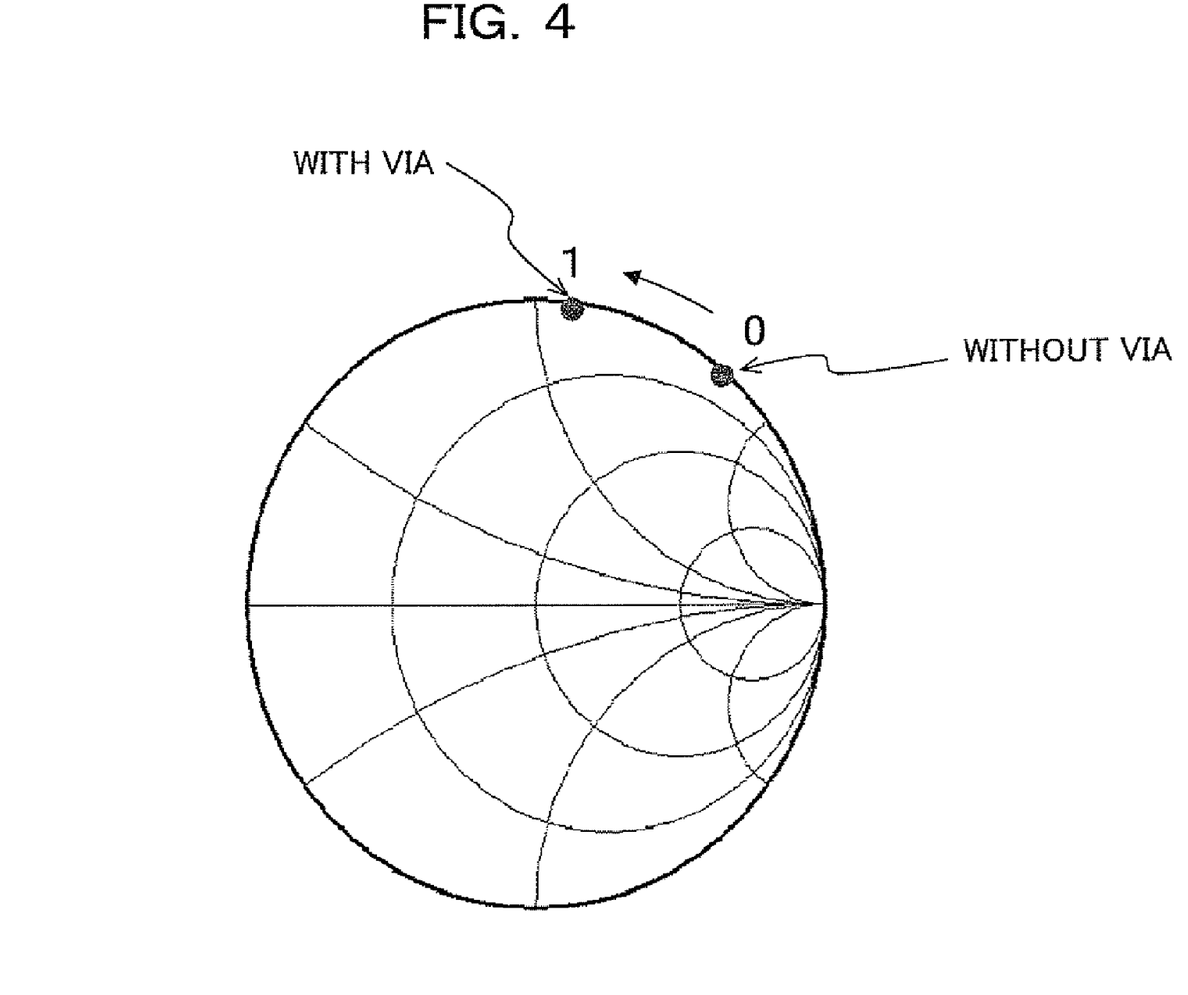
FIG. 4 is a Smith chart illustrating an antenna impedance of the simulation model depicted in FIG. 3.

As one example, change in the antenna impedance is illustrated in the Smith chart in FIG. 4 when the antenna pattern 2 is modeled when it is assumed that a wireless frequency tag has an exterior dimension of a length of 69 mm, a width of 35 mm, and a thickness 5 mm, as depicted in FIG. 3, the antenna pattern 2 has a thickness (conductor thickness) of 11μ and an electrical conductivity of $5 \times 10^6$ S/m, and the vias 4 are provided in the antenna pattern 2.

Figure 5:
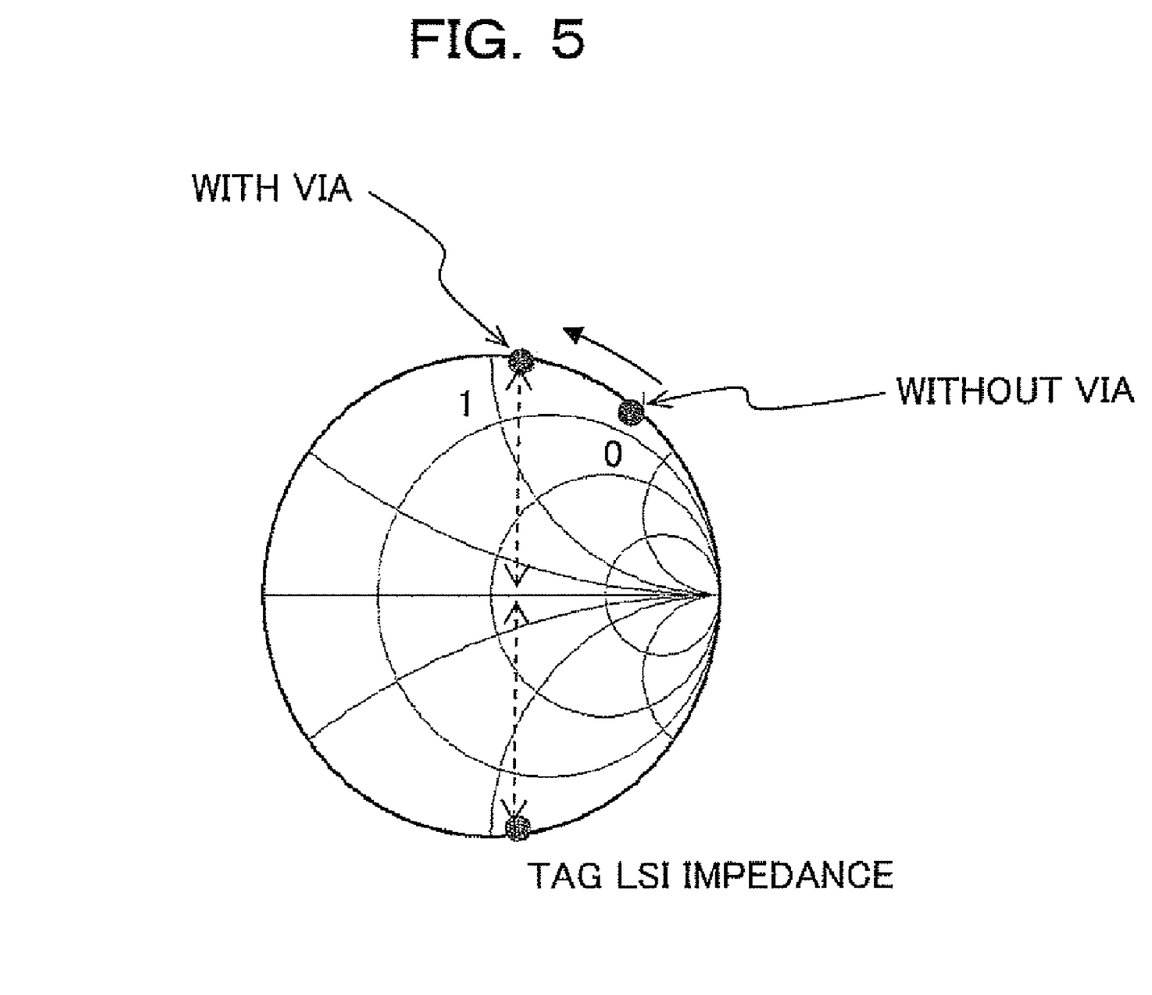
FIG. 5 is a Smith chart illustrating an antenna impedance of the simulation model depicted in FIG. 3.

In the Smith chart illustrated in FIG. 4, the location indicated by 0 represents an antenna impedance at 950 MHz when the vias 4 are not provided, and the location indicated by 1 represents a antenna impedance when the vias 4 are provided. It can be seen that the corresponding capacitance component Ccp of the antenna pattern 2 can be increased when the antenna impedance is rotated (shifted) counterclockwise. Thus, as depicted in FIG. 5, it becomes possible to achieve matching with the chip 5 having a greater capacitance component that is in the complex conjugate relationship with the location indicated by 1 on the Smith chart.

In addition, as illustrated in Table 1 and Table 2 below, drops in the gain and the communication distance caused by provision of the vias 4 are both small when the wireless frequency tag is attached to metal and when the wireless frequency tag is located in free space.

TABLE 1

Comparison on Gain

| Gain [dBi] | Matching with Vias | When Loop Length is Increased | No Vias, No Change in Loop Length |
|---|---|---|---|
| Attached on Metal | 1.93 | 1.11 | 3.38 |
| Free Space | 0.89 | −2.95 | 1.91 |

TABLE 2

Comparison on Communication Distance

| Communication Distance [m] | Matching with Vias | When Loop Length is Increased | No Vias, No Change in Loop Length |
|---|---|---|---|
| Attached on Metal | 1.873 | 1.695 | 0.179 |
| Free Space | 1.276 | 0.755 | 0.198 |

Note that the communication distance (r) indicated in Table 2 can be calculated using the following Eq. (1) and Eq. (2):

Eq. 1

$$r = \frac{\lambda}{4\pi} \sqrt{\frac{Pt \cdot Gt \cdot Gr \cdot q}{Pth}} \quad (1)$$

$$q = \frac{4RcRa}{|Zc + Za|^2} \quad (2)$$

λ: Wavelength
Pt: The power of the reader writer (RW) apparatus
Gt: The antenna gain
q: The matching coefficient
Pth: The minimum operating power of the chip 5
Gr: The tag antenna gain
Rc and Xc: The resistance of the chip 5 (reactance Zc=Rc+jXc)
Ra and Xa: The resistance of the antenna patterns (reactance Za=Ra+jXa)

The calculation conditions for the simulation are illustrated in the following Table 3.

TABLE 3

Simulation Calculation Conditions

| LSI | Pth | −5 | dBm |
|---|---|---|---|
| | Rcp | 2000.00 | Ω |
| | Ccp | 2.87 | pF |
| RW | Power | 27.00 | dBm |
| | Gain | 9.00 | dBi |

Note that, in the above Table 3, Rcp represents an equivalence of conductance (G) component of the admittance that is the inverse of the impedance Zc of the chip 5 (Yc=1/Zc=G+jB=(1/Rcp)+jωCcp), and Ccp represents an equivalence of the susceptance (B) component of admittance (Yc) of the integrated circuit 5.

Figure 6:
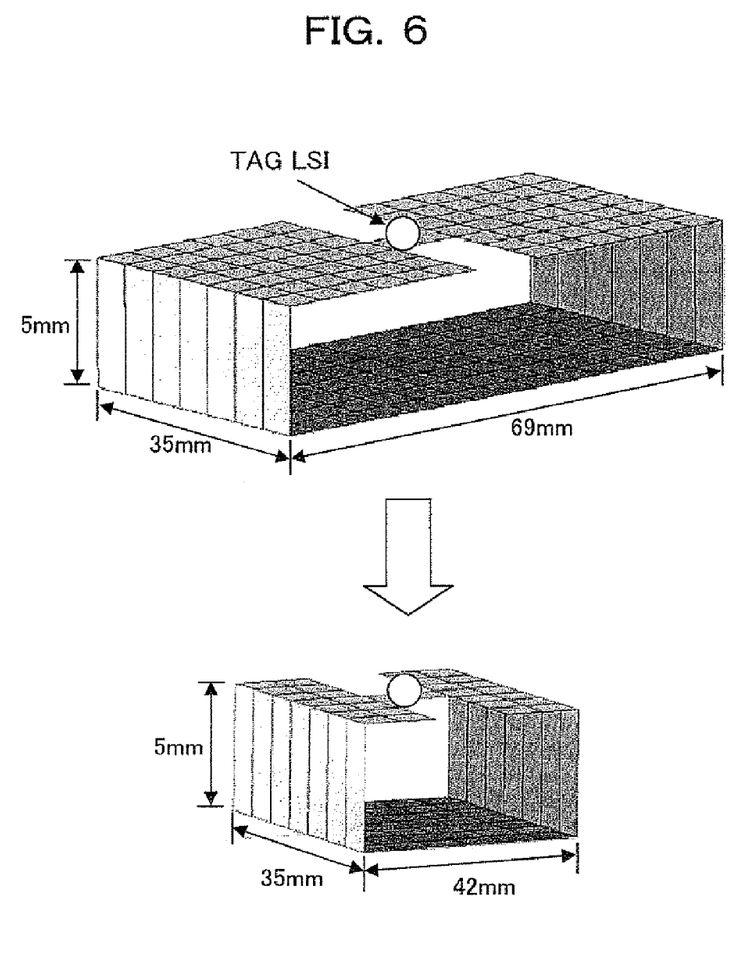
FIG. 6 is a schematic perspective view illustrating a simulation model of wireless frequency tag having a shorter loop length of the loop antenna.
Figure 7:
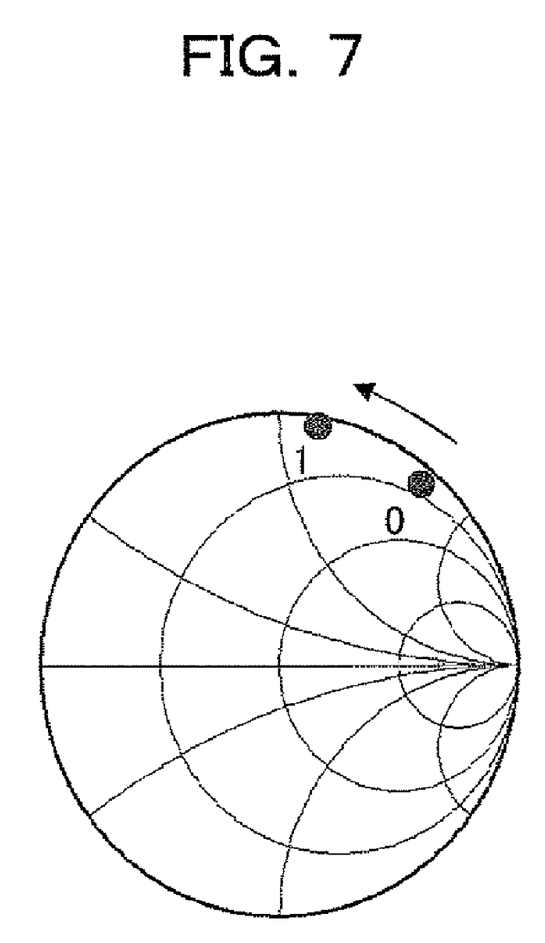
FIG. 7 is a Smith chart illustrating an antenna impedance of the simulation model depicted in FIG. 6.

In addition, as depicted in FIG. 6, it is also possible to shift the antenna impedance counterclockwise on the Smith chart by shortening the loop length of the antenna pattern 2 by shortening the length of the wireless frequency tag from 69 mm to 42 mm, for example, as depicted in FIG. 7. In this case, however, as indicated in the above Table 1 and Table 2, the gain is reduced and thus the communication distance is shortened since the loop length of the antenna pattern 2 is reduced.

Note that, as indicated in Table 1 and Table 2, although the gain peaks when no via 4 is provided and the loop length is not adjusted, the communication distance is decreased since matching cannot be achieved when the capacitance component Ccp of the chip 5 is high.

Thus, it is understood that the overall performance is increased when the vias 4 are provided as in this example.

(In Case of Single Via 4)

Figure 8:
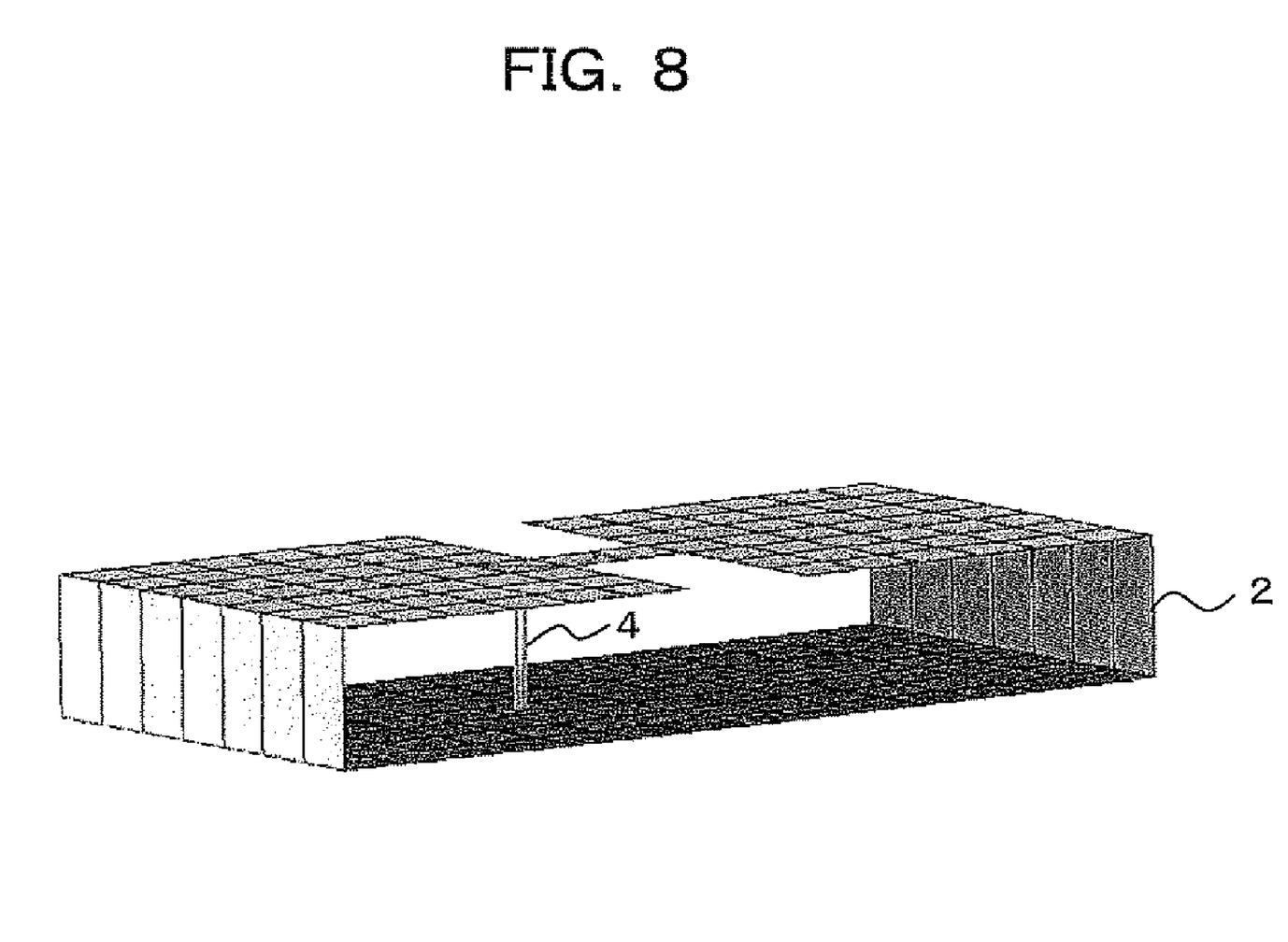
FIG. 8 is a schematic perspective view illustrating a simulation model of the wireless frequency tag depicted in FIG. 3 when a single via is used.
Figure 9:
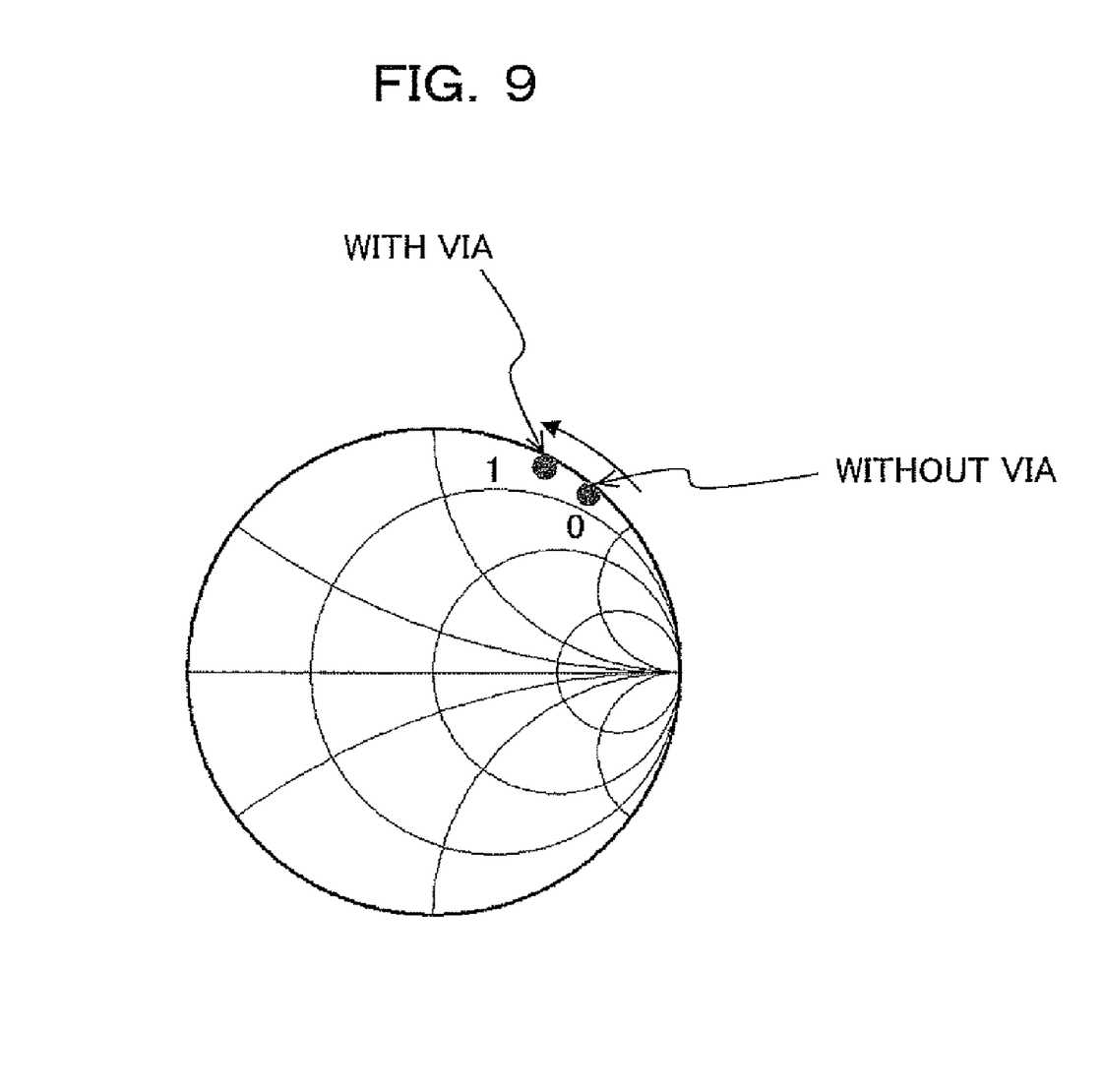
FIG. 9 is a Smith chart illustrating an antenna impedance of the simulation model depicted in FIG. 8.

As depicted in FIG. 8, for example, the number of vias 4 may be one. Note that the model depicted in FIG. 8 is similar to the model illustrated in FIG. 3, except for the number of vias. Even for the case where the number of vias is set to one as described above, the present inventor has confirmed through simulations that it is possible to rotate the antenna impedance counterclockwise on the Smith chart, as depicted in FIG. 9, and that a gain comparable to the case where two vias 4 are provided.

Greater magnitudes of rotation (angles) are obtained when two vias 4 are provided. More specifically, by modifying the number of vias, it is possible to adjust the variable value of capacitance component Ccp of the antenna impedance. Thus, it is noted that a greater corresponding capacitance component Ccp may be accommodated by providing greater number of vias.

(2) Second Embodiment

Figure 10:
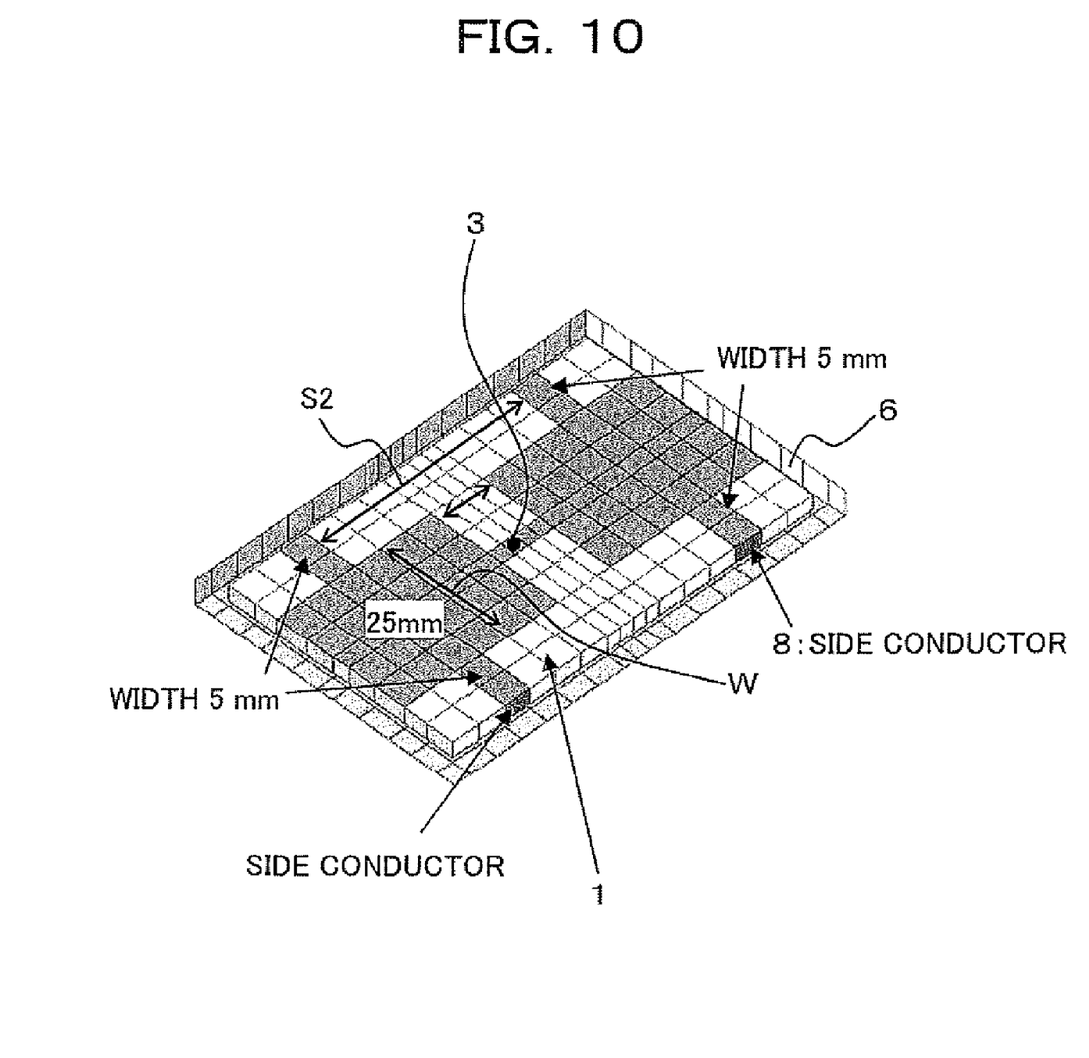
FIG. 10 is a schematic perspective view illustrating a configuration of a wireless frequency tag according to a second embodiment.

FIG. 10 is a schematic perspective view illustrating the configuration of the configuration of a wireless frequency tag according to a second embodiment of the present invention. Instead of providing vias as set forth, the wireless frequency tag depicted in FIG. 10 includes a conductor pattern (side conductor) 8 that extends a part of the antenna pattern 2 on the face of the substrate 1 (front face) on which the feeding point 3 is located (two symmetric locations with respect to the feeding point 3) to the ends of the width direction of the substrate 1, and communicates with the antenna pattern 2 on the face opposite to the front face (back face) through the side faces of the long sides of the substrate 1.

More specifically, in this example, the antenna patterns 2 that are provided through side face on the front and back faces of the substrate 1 are electrically coupled via the side conductor 8, which means the side conductor 8 plays a role similar to the vias 4 as a conducting member. Such a configuration is useful in cases where provision of vias 4 in the substrate 1 is difficult. Note that, in FIG. 10, reference symbol S2 indicates the gap of the side conductor 8. The side conductor 8 may not be necessarily located at locations symmetric with respect to the feeding point 3 in this example, and it may be provided at a single location on one side face of the substrate 1.

Thereby, in this wireless frequency tag, a first loop pattern having the conductor pattern 2 formed on the front and back faces of the substrate 1 as the outer periphery (long sides and short sides), and a second loop pattern having a part of the conductor pattern 2 formed on the front and back faces of the substrate 1 and the side conductor 8 as the inner periphery are defined.

Thus, it is possible to increase the corresponding capacitance component Ccp of the antenna pattern 2 by rotating (changing) the antenna impedance on the counterclockwise direction on the Smith chart while reducing a drop in the gain.

In addition, it is possible to adjust (increase) the corresponding capacitance component Ccp by changing (reducing) the distance S2 between the side conductors 8. Thus, it becomes possible to easily achieve impedance matching on the chip 5 having a greater susceptance component.

Figure 11:
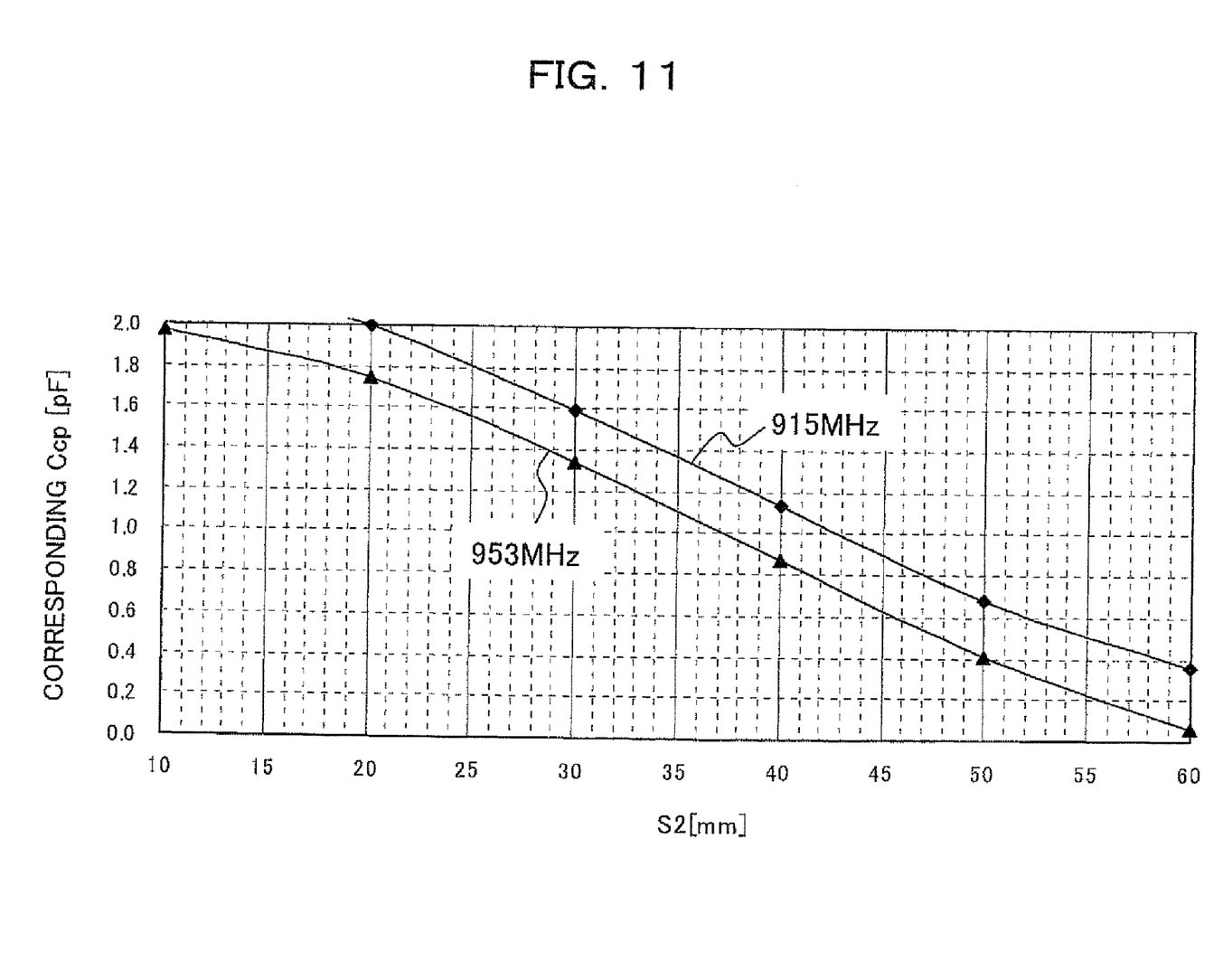
FIG. 11 is a graph indicating change in the corresponding capacitance component (Ccp) when the location of the side conductor of the wireless frequency tag depicted in FIG. 10.

As one example, change in the corresponding capacitance component Ccp when the spacing S2 of the side conductor 8 is varied is illustrated in FIG. 11 when it is assumed that the substrate 1 has a dimension of a length of 70 mm, a width of 44 mm, and a thickness of 3.14 mm, the relative permittivity $\in_r$ of the substrate 1 is 6.05, the current displacement angle tan δ is 0.003, the width W of the antenna pattern 2 is 25 mm, the width of extending from the antenna pattern 2 to the side conductor 8 is 5 mm.

As depicted in FIG. 11, both when the operating wavelength is 915 MHz and when the operating wavelength is 953 MHz, it is possible to increase the corresponding capacitance component Ccp by reducing the spacing S2 of the side conductor 8.

(3) Third Embodiment

Figure 12:
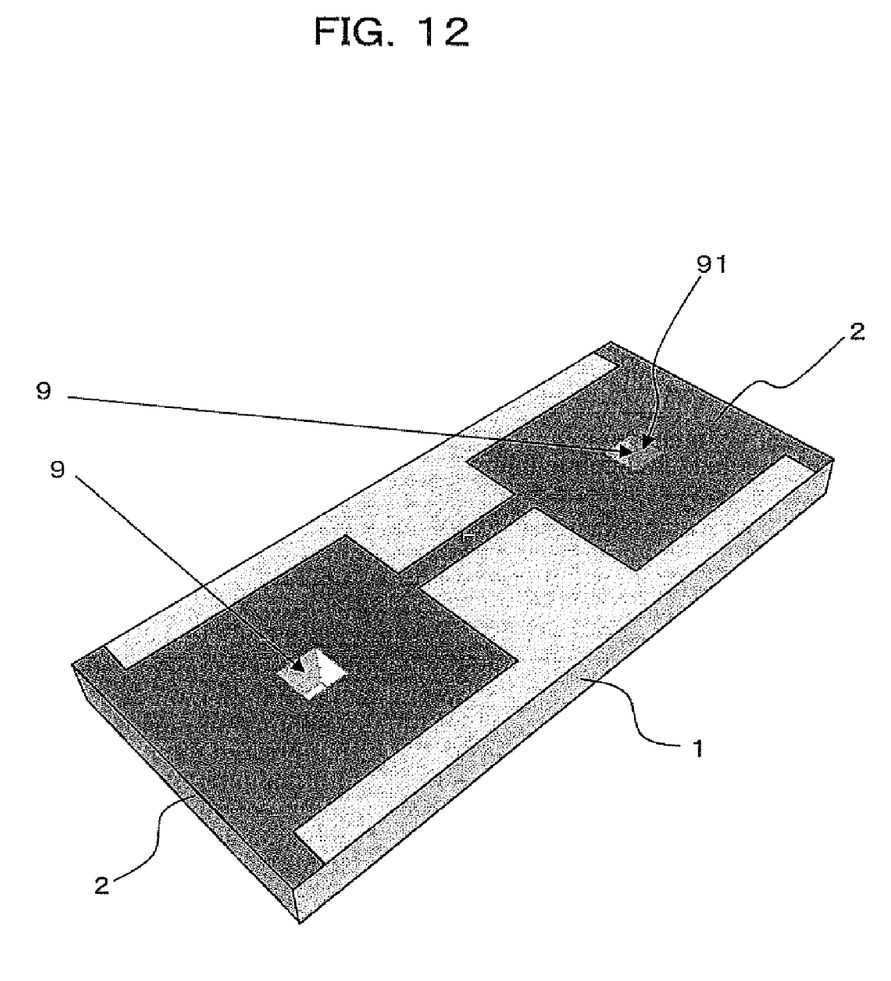
FIG. 12 is a schematic perspective view illustrating a configuration of a wireless frequency tag according to a third embodiment.

FIG. 12 is a schematic perspective view illustrating the configuration of a wireless frequency tag according to a third embodiment of the present invention. In the wireless frequency tag illustrated in FIG. 12, instead of the vias 4 described above, square pole shaped through-holes 9 having a cross-sectional area greater than that of the vias 4 are provided, and metal plating (conductor plating) 91 that electrically couple with the antenna patterns 2 formed on the front and back faces of the substrate 1 are provided at least one of the side walls (inner walls) of the through-holes 9.

More specifically, in this example, the antenna patterns 2 formed on the front and back faces of the substrate 1 are electrically coupled to each other by means of the metal plating 91 provided on the side walls of the through-hole 9, and the metal plating 91 plays a role similar to the above-described vias 4 as a conducting member. Note that the through-holes 9 (the metal plating 91) may not be necessarily provided at locations symmetric with respect to the feeding point 3 in this example, and they may be provided only at a single location. In addition, the shape of the through-hole 9 is not limited to the square pole shape, and may take a triangle pole shape or a cylindrical shape.

In addition, the metal plating 91 is provided on the entire face of the side wall that is located at the furthest from the feeding point 3 among the four side walls of the through-hole 9, it may be provided on other side wall(s). The metal plating 91 may also be applied only on a part of the side wall.

For example, it may be desirable that the metal plating 91 may be provided only a part of a side wall since disturbance to the current distribution at the antenna pattern 2 tends to be increased, causing a drop in the gain if the metal plating 91 is provided on the entire face of a side wall (inner wall) of a through-hole 9 having a larger cross-sectional area (radius) which has a larger cross-sectional area. For example, metal plating 91 in the form of a line may be provided on a surface of a side wall. That is, the greater the radius of the through-holes 9 is, the smaller the area of the conductor portion is preferred.

Thereby, in this wireless frequency tag, a first loop pattern having the conductor pattern 2 formed on the front face of the substrate 1 as the long sides (two sides that are opposing each other) and the short sides (the other two sides that are opposing each other), and a second loop pattern having a part of the conductor pattern 2 formed on the front face of the substrate 1 as the long sides and the metal plating 91 provided on the side walls of the through-holes 9 as the short sides are defined.

In the wireless frequency tag of the this example that is configured as described above, it is possible to rotate (change) the antenna impedance in the counterclockwise on the Smith chart while preventing the gain from being dropped by configuring the second loop pattern without modifying the loop length of the first loop pattern. More specifically, it is possible to increase the corresponding capacitance component Ccp of the antenna pattern 2.

In addition, it is possible to adjust (increase) the corresponding capacitance component Ccp by changing (reducing) the distance between the through-holed 9 (between the metal plating 91). Thus, it becomes possible to easily achieve impedance matching on the chip 5 having a greater susceptance component. Note that, in addition to changing the location at which the through-hole 9 is provided, the distance the metal plating 91 may also be changed by changing the location on which the metal plating 91 is provided without changing the location at which the through-hole 9 is provided.

(4) Others

In the above embodiments, antenna impedance (primarily, the corresponding capacitance component Ccp) are basically adjusted by varying the number of conducting members or the spacing therebetween of the vias 4 provided in the substrate 1, the side conductor 8, the through-hole 9 or the like which communicate with the antenna patterns 2, other adjustment technique may be employed in combination with the above technique. For example, additionally, the width of the antenna patterns 2 may be modified, or their location on the chip 5 of the substrate 1 may be changed, or the permittivity of the substrate 1 may be varied.

According to the embodiments above, since it is possible to change the impedance of the loop-shaped antenna pattern by providing the conducting member without changing the physical total length of the antenna pattern, a wireless frequency tag can be achieved which facilitates matching adjustment with a chip to be mounted while reducing a drop in the gain.

As described in detail above, since a wireless frequency tag that facilitates matching adjustment with a chip to be mounted on the tag while reducing a drop in the gain is achieved, the embodiments considered to be quite useful for the technical field of wireless communication or technical fields of production, inventory and distribution management of articles, POS systems, security systems, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless frequency tag comprising:
   a flat substrate;
   an antenna pattern, having a chip connecting section to be coupled to a chip, that is formed on at least three surfaces of the flat substrate wrapping around the flat substrate; and
   a conducting member that couples a part of the antenna pattern formed on one surface with a part of the antenna pattern formed on other surface of the flat substrate, wherein
   the antenna pattern is provided on a surface of a dielectric member,
   the conducting member includes a through-hole that couples the antenna patterns on each surface of the dielectric member through the inside of the dielectric member,
   a conductor plating is provided on a part of the inner wall of the through-hole, and wherein the area of the conductor plating is decreased as the radius of through-hole is increased.

2. A method for manufacturing a wireless frequency tag, the method comprising:
   forming an antenna pattern, having a chip connecting section to be coupled to a chip, on at least three surfaces of a flat substrate wrapping around the flat substrate; and
   forming a conducting member that couples a part of the antenna pattern formed on one surface with a part of the antenna pattern formed on other surface of the flat substrate, wherein
   the antenna pattern is provided on a surface of a dielectric member,
   the conducting member includes a through-hole that couples the antenna patterns on each surface of the dielectric member through the inside of the dielectric member,
   a conductor plating is provided on a part of the inner wall of the through-hole, and wherein the area of the conductor plating is decreased as the radius of through-hole is increased.

3. The method for manufacturing a wireless frequency tag according to claim 2, wherein impedance matching with the chip is adjusted by changing a spacing between a plurality of conducting members.

* * * * *